United States Patent
Nishino et al.

(10) Patent No.: US 10,937,570 B2
(45) Date of Patent: Mar. 2, 2021

(54) CONDUCTOR SHAPING APPARATUS

(71) Applicant: TOYOTA JIDOSHA KABUSHIKI KAISHA, Toyota (JP)

(72) Inventors: Junki Nishino, Toyota (JP); Hiromitsu Kuraoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

(21) Appl. No.: 16/239,593

(22) Filed: Jan. 4, 2019

(65) Prior Publication Data

US 2019/0221336 A1 Jul. 18, 2019

(30) Foreign Application Priority Data

Jan. 17, 2018 (JP) .............................. JP2018-005426

(51) Int. Cl.
| | | |
|---|---|---|
| *B23P 19/00* | (2006.01) | |
| *H01B 13/00* | (2006.01) | |
| *H01B 7/38* | (2006.01) | |
| *H01B 5/04* | (2006.01) | |
| *H02K 15/04* | (2006.01) | |
| *H02K 15/00* | (2006.01) | |
| *H01F 41/082* | (2016.01) | |

(52) U.S. Cl.
CPC ............ *H01B 13/0036* (2013.01); *H01B 5/04* (2013.01); *H01B 7/38* (2013.01); *H01F 41/082* (2016.01); *H02K 15/0068* (2013.01); *H02K 15/045* (2013.01); *Y10T 29/53161* (2015.01)

(58) Field of Classification Search
USPC ......... 29/736, 596, 598, 605, 606, 732, 760, 29/761
See application file for complete search history.

(56) References Cited

U.S. PATENT DOCUMENTS 10,050,500 B2 * 8/2018 Hashimoto ........ H02K 15/0056
10,622,872 B2 * 4/2020 Hashimoto ............. B21F 1/004

FOREIGN PATENT DOCUMENTS

JP          2017-93197        5/2017

* cited by examiner

*Primary Examiner* — Thiem D Phan
(74) *Attorney, Agent, or Firm* — Oblon, McClelland, Maier & Neustadt, L.L.P.

(57) ABSTRACT

A conductor shaping apparatus includes a driving device that relatively rotates an upper die and a lower die and integrally rotates the two dies with respect to a shaping member. The driving device rotates one of the upper and lower dies in a direction from an edgewise bent portion to a distal end of a conductor. One of the upper and lower dies includes a supporting surface configured to support a side surface of an end portion of the conductor as the edgewise bent portion is formed in the end portion, and a guide surface that is formed to intersect the support surface. The guide surface extends away from the end portion of the conductor in a direction opposite to a bent direction of a flatwise bent portion closest to the edgewise bent portion as it extends away from the supporting surface on an opposite side of a rotational axis.

7 Claims, 12 Drawing Sheets

CONDUCTOR SHAPING APPARATUS

CROSS-REFERENCE TO RELATED APPLICATION

The present disclosure claims priority to Japanese Patent Application No. 2018-005426 filed on 17 Jan. 2018, which is incorporated herein by reference in its entirety including specification, drawings and claims.

TECHNICAL FIELD

The present disclosure relates to a conductor shaping apparatus and method to form a bent portion in a conductor.

BACKGROUND

A conventionally known conductor shaping apparatus includes a fixed die, a movable die that is rotated about a rotational axis and a cam mechanism (as shown in, for example, Patent Literature 1). The conductor shaping apparatus forms at least one first bent portion that is bent in a flatwise direction of a conductor, at least one second bent portion that is bent in an edgewise direction substantially orthogonal to the flatwise direction and a third bent portion that is bent in the edgewise direction near a distal end of the conductor. The fixed die of the conductor shaping apparatus includes a first shaping surface to form the first bent portion, and a first edgewise bending portion to form the second bent portion. The movable die includes a second shaping surface to form the first bent portion, a second edgewise bending portion to form the second bent portion and a protrusion (forth protrusion) to form the third bent portion. When the movable die is rotated in a first direction about the rotating axis with respect to the fixed die, the first bent portion is formed in the conductor by the first shaping surface of the fixed die and the second shaping surface of the movable die. When the movable die is further rotated in the first direction after the first bent portion is formed, the second edgewise bending portion of the movable die presses the conductor against the first edgewise bending portion of the fixed die so as to form the second bent portion in the conductor. When the movable die is further rotated in the first direction after the second bent portion is formed, the fixed dies is slightly rotated together with the movable die, so that the cam member is rotated while contacting with the fixed cam follower. Thus, a distal end of the conductor is pressed by the rotated cam member and is bent about the protrusion, so that the third bent portion is formed in the conductor.

CITATION LIST

Patent Literature

PTL1: Japanese Patent Application Laid Open No. 2017-93197

SUMMARY

The above conventional conductor shaping apparatus disclosed in PTL1 enables the first, second and third bent portions to be formed in the conductor by rotating the movable die in one direction. However, the protrusion may interfere with the an end portion of the conductor and deform the end portion in the above conductor shaping apparatus when the movable die is rotated to be separated from the fixed die, because the protrusion protrudes from an inclined surface of the movable die so as to form the third bent portion.

A subject matter of the disclosure is to provide conductor shaping apparatus capable of accurately forming a bent portion with a desired shape in an end portion of a conductor and preventing a deformation of the end portion of the conductor caused by forming the bent portion.

The disclosure is directed to a conductor shaping apparatus configured to relatively rotate an upper die and a lower die about a rotational axis so as to form at least one flatwise bent portion in a conductor and to relatively rotate the upper and lower dies that hold the conductor and a shaping member so as to form at least one edgewise bent portion in an end portion of the conductor while pressing the shaping member against the end portion. The conductor shaping apparatus includes a driving device configured to relatively rotate the upper and lower dies and to integrally rotate the upper and lower dies with respect to the shaping member. The driving device is configured to rotate one of the upper and lower dies in a direction from the edgewise bent portion to a distal end (free end) of the conductor so as to separate the one of the upper and lower dies from the other. Further, one of the upper and lower dies includes a supporting surface configured to support a side surface of the end portion as the edgewise bent portion is formed in the end portion of the conductor, and a guide surface that is formed to intersect the support surface. The guide surface extends away from the end portion of the conductor in a direction opposite to a bent direction of the flatwise bent portion closest to the edgewise bent portion as it extends away from the supporting surface on an opposite side of the rotational axis.

The conductor shaping apparatus of the disclosure relatively rotates the upper and lower dies about the rotational axis by the driving device, so that at least one flatwise bent portion is formed in the conductor. Further, the driving device relatively rotates the upper and lower dies that hold the conductor and the shaping member so as to form the edgewise bent portion in the end portion of the conductor. On this occasion, the end portion of the conductor is pressed by the shaping member and is guided to the supporting surface by the guide surface formed in the one of the upper and lower dies so as to be clamped between the supporting surface and the shaping member. As a result, the edgewise bent portion with a desired shape is accurately formed in the end portion of the conductor. After the edgewise bent portion is formed in the end portion of the conductor, the driving device rotates the one of the upper and lower dies in the direction from the edgewise bent portion to the distal end of the conductor so as to separate the one of the upper and lower dies from the other. When the one of the upper and lower dies is rotated so as to be separated from the other, the guide surface does not interfere with the end portion of the conductor because the guide surface is formed to extend away from the end portion of the conductor in the direction opposite to the bent direction of the flatwise bent portion closest to the edgewise bent portion as it extends away from the supporting surface on an opposite side of the rotational axis. This configuration prevents the end portion of the conductor from being deformed by the one of the upper and lower dies when separating the one of the upper and lower dies from the others. Accordingly, the conductor shaping apparatus of the disclosure is capable of accurately forming the edgewise bent portion with the desired shape in the end portion of the conductor and preventing a deformation of the end portion of the conductor caused by forming the bent portion.

A height of the supporting surface may be 1-1.5 times a thickness of the conductor in a flatwise direction. This configuration enables the end portion of the conductor to be tightly clamped between the supporting surface and the shaping member, so that the edgewise bent portion is accurately formed in the conductor.

The guide surface may include a flat surface orthogonal to the rotational axis. This configuration enables the end portion of the conductor to be smoothly guided to the support surface by the guide surface when forming the edgewise bent portion and prevents an interference between the one of the upper and lower dies and the conductor when separating the one of the upper and lower dies from the other.

The supporting surface and the guide surface may be formed in the upper die.

The conductor shaping apparatus may include an elastic body that presses the shaping member against the end portion in response to a contact between the shaping member and the end portion of the conductor. The lower die may include a movement restricting portion that contacts with the shaping member so as to restrict a movement of the shaping member on a side of the end portion by a force from the elastic body when the upper and lower dies and the shaping member are relatively rotated. This configuration decreases a movable range of the shaping member or an extension and contraction range of the elastic body while adequately securing rigidity of the elastic body required to form the edgewise bent portion, thereby preventing a pressing force applied to the conductor from the shaping member depending on a displacement of the elastic body from unnecessarily increasing. As a result, the conductor is not excessively pressed by the shaping member that is pressed by the elastic body, thereby preventing the edgewise bent portion from being excessively bent and preventing a portion of the conductor near the edgewise bent portion from being damaged by the shaping member.

The driving device may include an upper driving device configured to apply driving force to the upper die and to rotate the upper die about the rotational axis, and a lower driving device configured to apply driving force to the lower die and to rotate the lower die about the rotational axis. In the conductor shaping apparatus, the lower driving device applies driving force to the lower die and the upper driving device applies driving force to the upper die so that the conductor is tightly clamped between the upper and lower dies, thereby enabling the flatwise bent portion to be accurately formed in the conductor. In addition, the lower driving device applies driving force to the lower die and the upper driving device applies driving force to the upper die when the upper and lower dies are integrally rotated with respect to the shaping member so as to maintain a state where the conductor is tightly clamped between the upper and lower dies, thereby enabling the edgewise bent portion to be accurately formed in the conductor.

The conductor may be a bus bar portion that extends from one end of a coil. The holding section may be configured to hold the coil.

DESCRIPTION OF EMBODIMENTS

The following describes some embodiments of the disclosure with reference to drawings.

Figure 1:
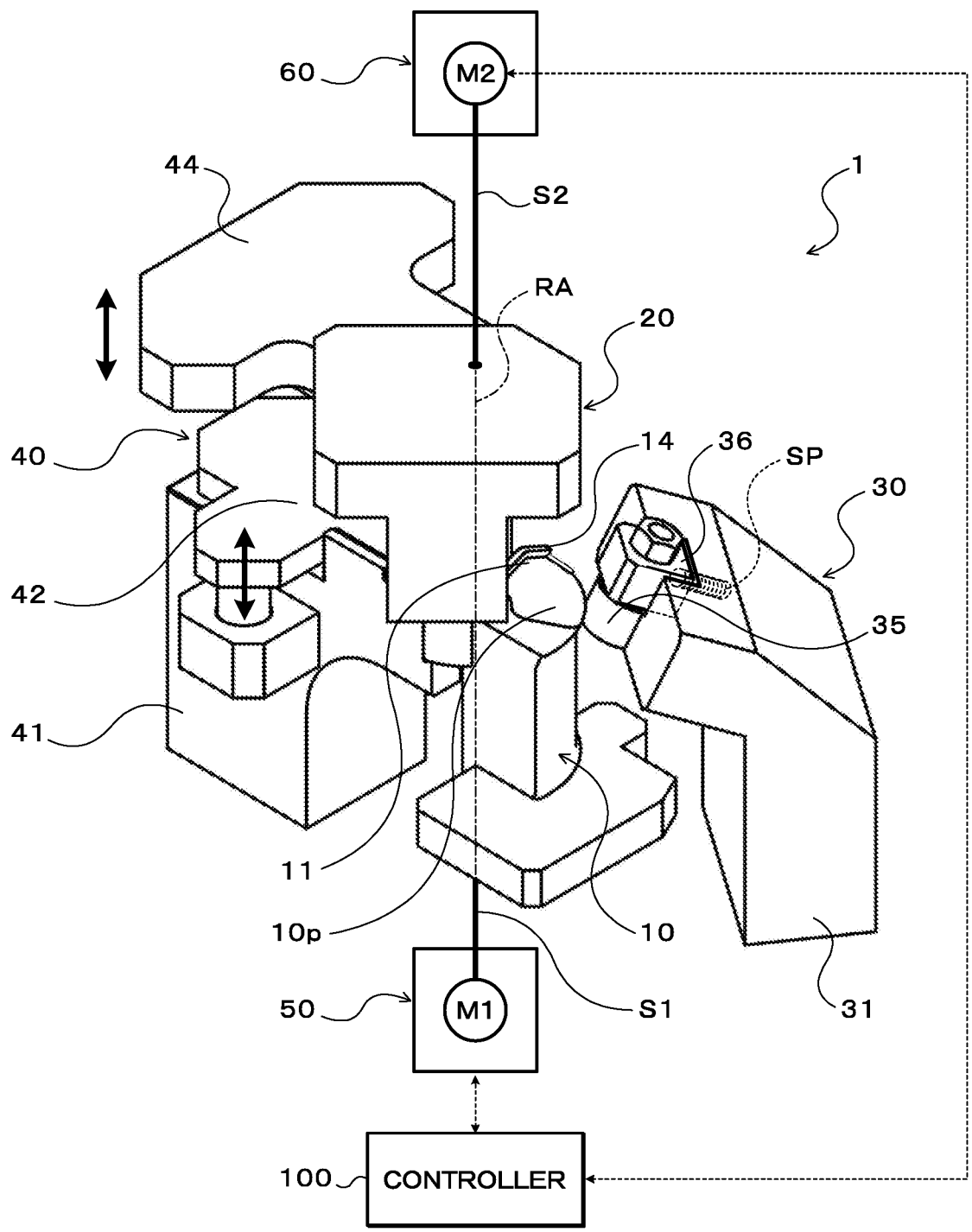
FIG. 1 is a schematic configuration diagram illustrating a conductor shaping apparatus according to the disclosure.

FIG. 1 is a schematic configuration diagram illustrating a conductor shaping apparatus 1 according to the disclosure. The conductor shaping apparatus 1 of FIG. 1 is configured to shape a bus bar portion B that extends from one end of a coil C shown in FIG. 2. The coil C is a rectangular coil (cassette coil) of a concentrated winding type that is formed by winding one rectangular wire (conductor) in two layers and multi columns (for example 6-10 columns) while bending the rectangular wire in an edgewise direction. For example, the coil C is applied to a three-phase AC motor mounted on an electric vehicle, a hybrid vehicle or the like. The rectangular wire is formed to include an insulating layer (for example, enamel resin) that is formed on a surface of the conductor. The coil C has a substantially truncated square pyramid outer shape and includes a short lead portion (terminal portion) L that extends from the other end of the coil C. As shown in the figure, the bus bar portion B of the coil C extends in a direction approaching the lead portion L. In the bus bar portion B and the lead portion L, the insulating layer of the rectangular wire is removed from a distal end portion within a predetermined area.

Figure 2:
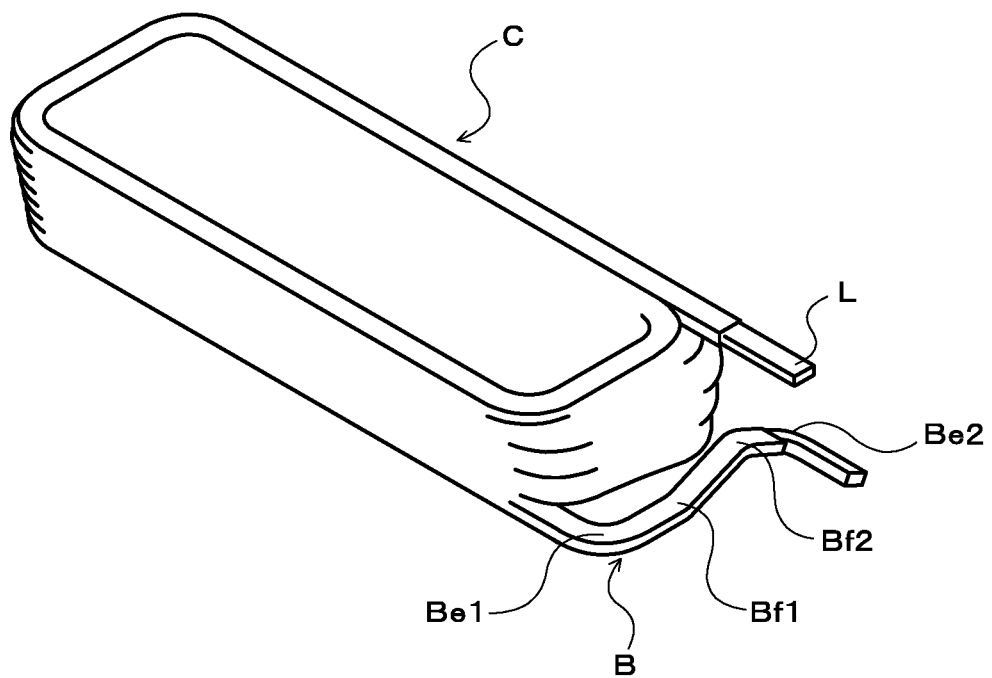
FIG. 2 is a perspective view illustrating a coil with a bus bar portion that is shaped by the conductor shaping apparatus of FIG. 1.

As shown in FIG. 2, the bus bar portion B of the coil C is configured to include a plurality of edgewise bent portions (first bent portions) Be1 and Be2 that are bent in the edgewise direction (first bent direction: a direction substantially orthogonal to short sides of a cross section of the rectangular wire) and a plurality of flatwise bent portions (second bent portions) Bf1 and Bf2 that are bent in a flatwise direction (second bent direction: a direction substantially orthogonal to long sides of the cross section of the rectangular wire). In the embodiment, the edgewise bent portion Be1 in a most proximal end side (root side) of the bus bar portion B and the edgewise bent portion Be2 in a most distal end side are bent in opposite directions each other. The flatwise bent portions Bf1 and Bf2 are formed between the edgewise bent portions Be1 and Be2 and are bent in opposite directions each other.

As shown in FIG. 1, the conductor shaping apparatus 1 is configured to include a first shaping die 10 and a second shaping die 20 to form the plurality of flatwise bent portions Bf1 and Bf2 in the bus bar portion B of the coil C, a distal end shaping portion 30 (refer to FIG. 3) to form the edgewise bent portion Be2 in the distal end portion of the bus bar portion B, a coil holding section 40 configured to hold the coil C, a first driving device (lower driving device) 50 with a drive shaft S1, a second driving device (upper driving device) 60 with a drive shaft S2, and a controller 100 that controls the first and second driving devices 50, 60 and the coil holding section 40.

As shown in FIG. 1, the first shaping die 10 is a lower die including a die surface on an upper side in the figures. A distal end of the drive shaft S1 of the first driving device 50 is fixed to a lower surface in the figures (surface opposite to the die surface) of the first shaping die 10. The second shaping die 20 is an upper die including a die surface capable of covering the die surface of the first shaping die 10 on a lower side in the figures. A distal end of the drive shaft S2 of the second driving device 60 is fixed to an upper surface in the figures (surface opposite to the die surface) of the second shaping die 20. The distal end shaping portion 30 and the coil holding section 40 are fixed to an installation place of the conductor shaping apparatus 1. The first driving device 50 is disposed (fixed) below the first shaping die 10 in FIG. 1 such that the drive shaft S1 coaxially extends with a rotational axis RA that extends in a vertical direction of the installation place of the conductor shaping apparatus 1. The second driving device 60 is disposed (fixed) above the second shaping die 20 in FIG. 1 such that the drive shaft S2 coaxially extends with the rotational axis RA.

Figure 3:
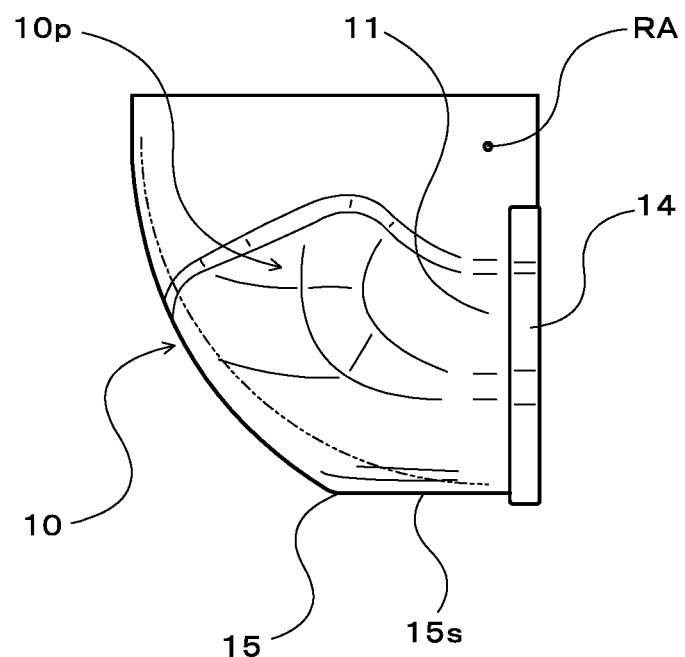
FIG. 3 is a plan view illustrating a first shaping die of the conductor shaping apparatus according to the disclosure.

As shown in FIGS. 1 and 3, the first shaping die 10 includes a pressing surface 10p that extends from an end portion near the second shaping die 20 to an opposite end portion, a first flatwise shaping surface 11 configured to form the flatwise bent portions Bf1 and Bf2 in the bus bar portion B of the coil C and a stepped portion 14 that is formed in the first shaping die 10 so as to extend along the end portion far from the second shaping die 20. The pressing surface 10p has a substantially circular sector planar shape that extends about the rotational axis RA. The pressing surface 10p is formed such that a surface shape thereof gradually changes about the rotational axis RA from an end portion near the second shaping die 20 to an end portion on the first flatwise shaping surface 11 side.

The first flatwise shaping surface 11 of the first shaping die 10 continues to the pressing surface 10p and includes a first curved surface (concave curved surface) corresponding to a lower surface in FIG. 2 of the flatwise bent portion Bf1 of the bus bar portion B and a second curved surface (convex curved surface) corresponding to the lower surface in FIG. 2 of the flatwise bent portion Bf2 of the bus bar portion B. The first flatwise shaping surface 11 further includes a flat surface that is disposed on the rotational axis RA side of the first curved surface and corresponds to the lower surface in FIG. 2 of the bus bar portion B between the edgewise bent portion Be1 and the flatwise bent portion Bf1, a flat inclined surface that extends upward in FIG. 1 between the first and second curved surfaces and corresponds to the lower surface in FIG. 2 of the bus bar portion B between the flatwise bent portions Bf1 and Bf2, and a flat inclined surface that extends downward in FIG. 1 on an opposite side of rotational axis RA with respect to the second curved surface and corresponds to the lower surface in FIG. 2 of the bus bar portion B on the distal end side of the flatwise bent portion Bf2. A side surface of the stepped portion 14 of the first shaping die 10 on the second shaping die 20 side is a flat surface that extends in a radial direction of the first shaping die 10.

As shown in FIG. 3, a roller movement restricting portion 15 is formed in an outer circumferential portion of the first shaping die 10 so as to be positioned below (on the drive shaft S1 side of) the pressing surface 10p, first flatwise shaping surface 11 and the stepped portion 14. The roller movement restricting portion 15 is formed to protrude an outside of a circular arc (refer to two-dot chain line in FIG. 3) in the radial direction of the first shaping die 10. The circular arc extends about the rotational axis RA so as to define an outer circumference of the pressing surface 10p and intersects an outer circumferential end (end portion opposite to the rotational axis RA) of the first flatwise shaping surface 11. In the embodiment, the roller movement restricting portion 15 includes a flat outer circumferential surface 15s orthogonal to the side surface of the stepped portion 14 on the second shaping die 20 side.

The second shaping die 20 includes a second flatwise shaping surface (not shown) configured to form the flatwise bent portions Bf1 and Bf2 in the bus bar portion B of the coil C as the die surface. The second flatwise shaping surface of the second shaping die 20 includes a first curved surface (convex curved surface) corresponding to an upper surface in FIG. 2 of the flatwise bent portion Bf1 and a second curved surface (concave curved surface) corresponding to the upper surface in FIG. 2 of the flatwise bent portion Bf2. The second flatwise shaping surface further includes a flat surface that is disposed on the rotational axis RA side of the first curved surface and corresponds to the upper surface in FIG. 2 of the bus bar portion B between the edgewise bent portion Be1 and the flatwise bent portion Bf1, a flat inclined surface that extends upward in FIG. 1 between the first and second curved surfaces and corresponds to the upper surface in FIG. 2 of the bus bar portion B between the flatwise bent portions Bf1 and Bf2, and a flat inclined surface that extends downward in FIG. 1 on the opposite side of rotational axis RA with respect to the second curved surface and corresponds to the upper surface in FIG. 2 of the bus bar portion B on the distal end side of the flatwise bent portion Bf2.

In addition, a guide surface (not shown) is formed in an end portion of the second shaping die 20 near the first shaping die 10. The guide surface is configured to include a conical surface that extends about the rotational axis RA and continues to the flat surfaces, the curved surfaces and the inclined surfaces of the second flatwise shaping surface, and the like. Further, a stepped portion is formed in an end portion of the second shaping die 20 far from the first shaping die 10 so as to protrude downward in FIG. 1 from the second flatwise shaping surface and to extend along the second flatwise shaping surface. A side surface of the stepped portion on the first shaping die 10 side is a flat surface that extends in a radial direction of the second shaping die 20.

Figure 4:
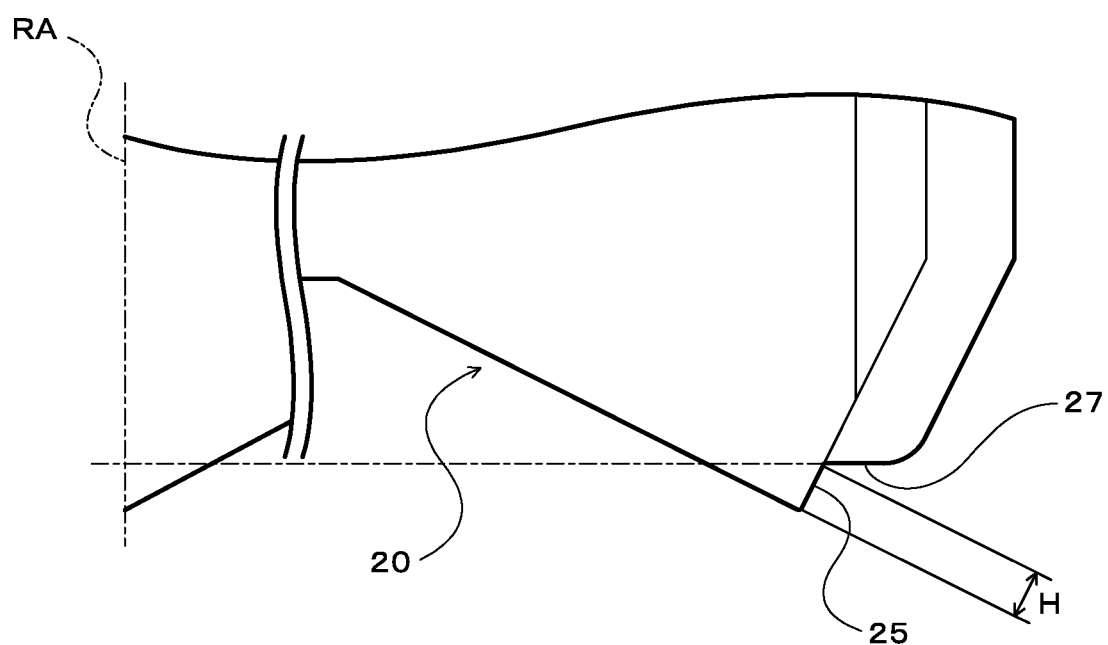
FIG. 4 is a plan view illustrating a principal portion of a second shaping die of the conductor shaping apparatus according to the disclosure.

As shown in FIG. 4, a supporting surface 25 and a distal end guide surface 27 are formed in an outer circumferential surface (side surface) of a lower portion of the second shaping die 20. The supporting surface 25 is configured to support a side surface including the short sides (edgewise surface) of the distal end portion Bt (refer to FIG. 7) of the bus bar portion B when the edgewise bent portion Be2 is gradually formed. The supporting surface 25 is a flat surface that is inclined with respect to the rotational axis RA in a bent direction (clockwise direction in FIG. 4) of the flatwise bent portion Bf2 by an angle corresponding to a bent angle of the flatwise bent portion Bf2 closest to the edgewise bent portion Be2 with respect to a horizontal plane. That is, the supporting surface 25 is orthogonal to a portion of the bus bar portion B between the flatwise bent portion Bf2 and the edgewise bent portion Be2. A height H of the supporting surface 25 (height of a range capable of actually contacting with the side surface of the distal end portion Bt, see FIG. 4) is defined to be 1-1.5 times, preferably 1-1.2 times a thickness of the bus bar portion B in the flatwise direction (length of the short side of the rectangular wire). As shown in FIG. 4, the distal end guide surface 27 of the second shaping die 20 includes a flat surface that intersects an upper edge of the supporting surface 25 and is orthogonal to the rotational axis RA. An outer circumferential end portion of the distal end guide surface 27 is formed in a curved shape so as to extend upward as it extends apart from the rotational axis RA.

As shown in FIG. 1, the distal end shaping portion includes the supporting block 31 that is fixed to the installation place of the conductor shaping apparatus 1 and the shaping roller (shaping member) 35 or a bending jig that is rotatably supported by the supporting block 31. The supporting block 31 is disposed on a downstream side in a rotational direction of the first shaping die 10 that is rotated about the rotational axis RA from an initial position (stop position) thereof so as to approach the second shaping die 20. The supporting block 31 is disposed such that the shaping roller faces the first shaping die 10. In the embodiment, as shown FIG. 1, the shaping roller 35 is rotatably supported by the bracket 36. The bracket 36 is slidably supported by the supporting block 31 and a spring (elastic body) SP is disposed between the bracket 36 and the supporting block 31. The spring SP presses the shaping roller 35 in a direction apart from the supporting block 31. In the embodiment, the spring SP is a coil spring. The spring SP may be a leaf (flat) spring or a disc spring. A rubber member or a resin member may be disposed between the bracket 36 and the supporting block 31 instead of the spring SP.

As shown FIG. 1, the coil holding section 40 includes a supporting base 41 that is fixed to the installation place of the conductor shaping apparatus 1, a coil placing table 42 that is vertically movably supported by the supporting base 41, and a coil pressing plate 44 that is vertically movably supported by the supporting base 41. When the coil C conveyed by a coil conveyor is placed on the coil placing table 42 of the coil holding section 40, the coil placing table 42 is lowered by a driving mechanism (not shown) that is controlled by the control device 100 and the coil pressing plate 44 is lowered by the driving mechanism so as to contact with the coil C. As a result, the coil C is securely held (clamped) by the coil holding section 40. When a shaping of the coil C by the conductor shaping apparatus 1 is completed, the coil placing table 42 is raised by the driving mechanism and the coil pressing plate 44 is raised by the driving mechanism so as to be separated from the coil C. This operation enables the coil C to be transferred from the coil placing table 42 to the coil conveyor (not shown) after shaping the coil C.

Further, the coil holding section 40 includes a proximal end shaping portion 45 (refer to FIG. 8 and the like) configured to form the edgewise bent portion Be1 in the most proximal end side of the bus bar portion B. The proximal end shaping portion 45 is formed in the supporting base 41 such that a side surface thereof contacts with an inner side surface (surface on the lead portion L side) of the bus bar portion B of the coil Con the lowered coil placing table 42. In addition, an edgewise shaping surface is formed in a distal end portion (end portion near the first shaping die 10) of the proximal end shaping portion 45. The edgewise shaping surface is a curved surface (cylindrical curved surface) corresponding to the edgewise bent portion Be1.

The first driving device 50 includes a motor M1 that is controlled by the controller 100 so as to apply a rotational torque (driving force) to the drive shaft S1. The first driving device 50 drives and rotates the drive shaft S1 by the motor M1 so as to rotate (turn) the first shaping die 10 about the rotational axis RA in normal and reverse directions. The second driving device 60 includes a motor M2 that is controlled by the controller 100 so as to apply a rotational torque (driving force) to the drive shaft S2. The second driving device 60 drives and rotates the drive shaft S2 by the motor M2 so as to rotate (turn) the second shaping die 20 about the rotational axis RA in normal and reverse directions.

The controller 100 of the conductor shaping apparatus 1 includes a computer with a CPU, ROM, RAM and the like, driving circuits for the motor M1 of the first driving device 50 and the motor M2 of the second driving device 60, a control circuit for the driving mechanism of the coil holding section 40, and the like. The controller 100 acquires a signal from a rotational sensor (not shown) that is included in the first driving device 50 and detects a rotational position of either the rotational shaft of the motor M1 or the drive shaft S1, a signal from a rotational sensor (not shown) that is included in the second driving device 60 and detects a rotational position of either the rotational shaft of the motor M2 or the drive shaft S2, and the like.

Further, in the controller 100, hardware such as the CPU, driving circuits and the like and previously installed programs cooperate to form a control module for the first driving device 50, a control module for the second driving device 60, a control module for the coil holding section 40, and the like as functional blocks. The control module for the first driving device 50 is programmed to control the motor M1 so that the drive shaft S1 is rotated at a desired rotational speed in a desired rotational direction (rotational speed control). Further, the control module for the first driving device 50 is programmed to control the motor M1 so that a desired rotational torque is applied to the drive shaft S1 (torque control). Similarly, the control module for the second driving device 60 is programmed to control the motor M2 so that the drive shaft S2 is rotated at a desired rotational speed in a desired rotational direction (rotational speed control). Further, the control module for the second driving device 60 is programmed to control the motor M2 so that a desired rotational torque is applied to the drive shaft S2 (torque control). The control module for the coil holding section 40 is programmed to control the driving mechanism (not shown) in accordance with progress of shaping the bus bar portion B by the conductor shaping apparatus 1 so as to vertically move the coil placing table 42 and the coil pressing plate 44.

The following describes a shaping procedure of the bus bar portion B of the coil C by the above conductor shaping apparatus 1.

Figure 5:
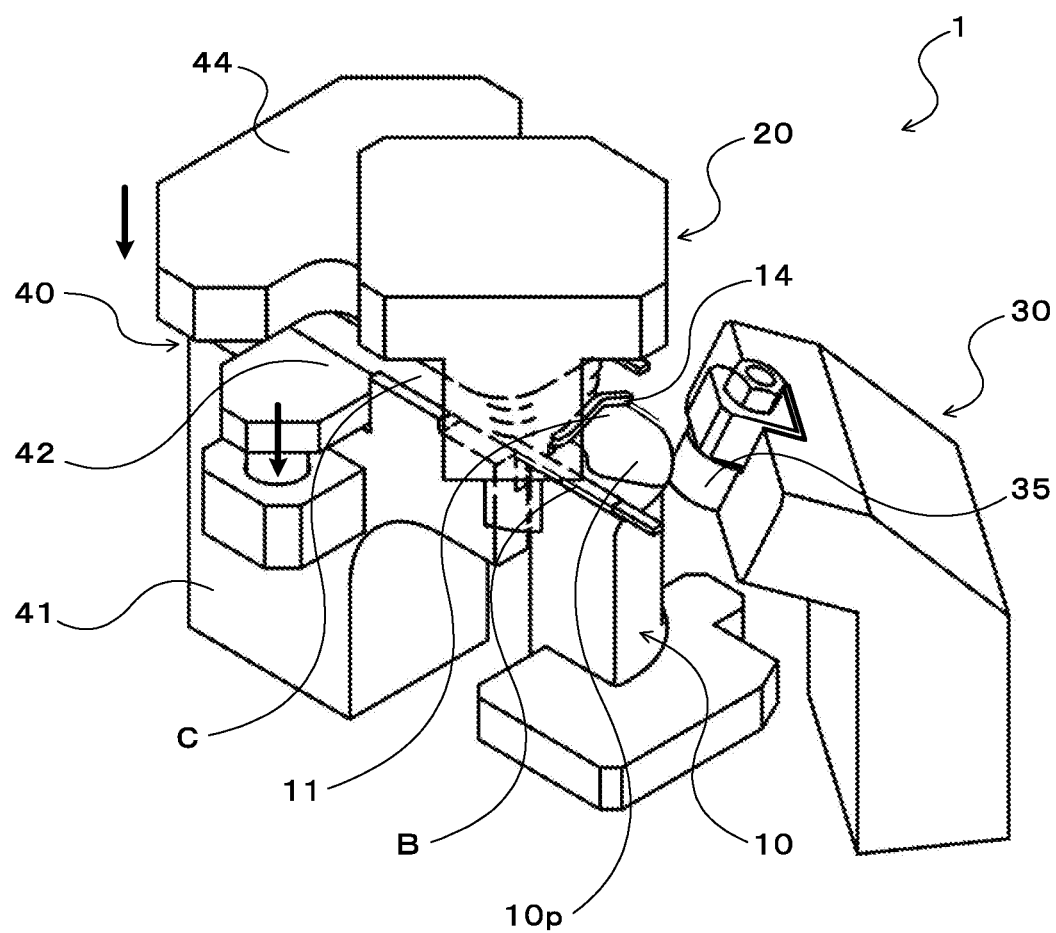
FIG. 5 is a perspective view illustrating an operation of the conductor shaping apparatus according to the disclosure.

At a start of shaping of the bus bar portion B of the coil C by the above conductor shaping apparatus 1, the controller 100 moves the first and second shaping dies 10 and to respective initial positions shown in FIG. 1 so that the first and second shaping dies 10 and 20 are separated from each other. Further, the controller 100 controls the driving mechanism of the coil holding section 40 so as to raise the coil placing table 42 and the coil pressing plate 44 to respective initial positions shown in FIG. 1. The coil conveyor conveys the coil C that is wound by a coil winder and includes the unshaped bus bar portion B to the coil holding section 40 and places the coil C on the coil placing table 42. When the coil C is placed on the coil placing table 42, the controller 100 controls the driving mechanism of the coil holding section 40 so that the coil placing table 42 is lowered and the coil pressing plate 44 contacts with the coil C as shown in FIG. 5. As a result, the coil C is securely held (clamped) by the coil holding section and the bus bar portion B of the coil C extends straight. Further, The inner side surface (the surface on the lead portion L side) of the bus bar portion B contacts with the side surface of the proximal end shaping portion 45 of the coil holding section 40.

Figure 6:
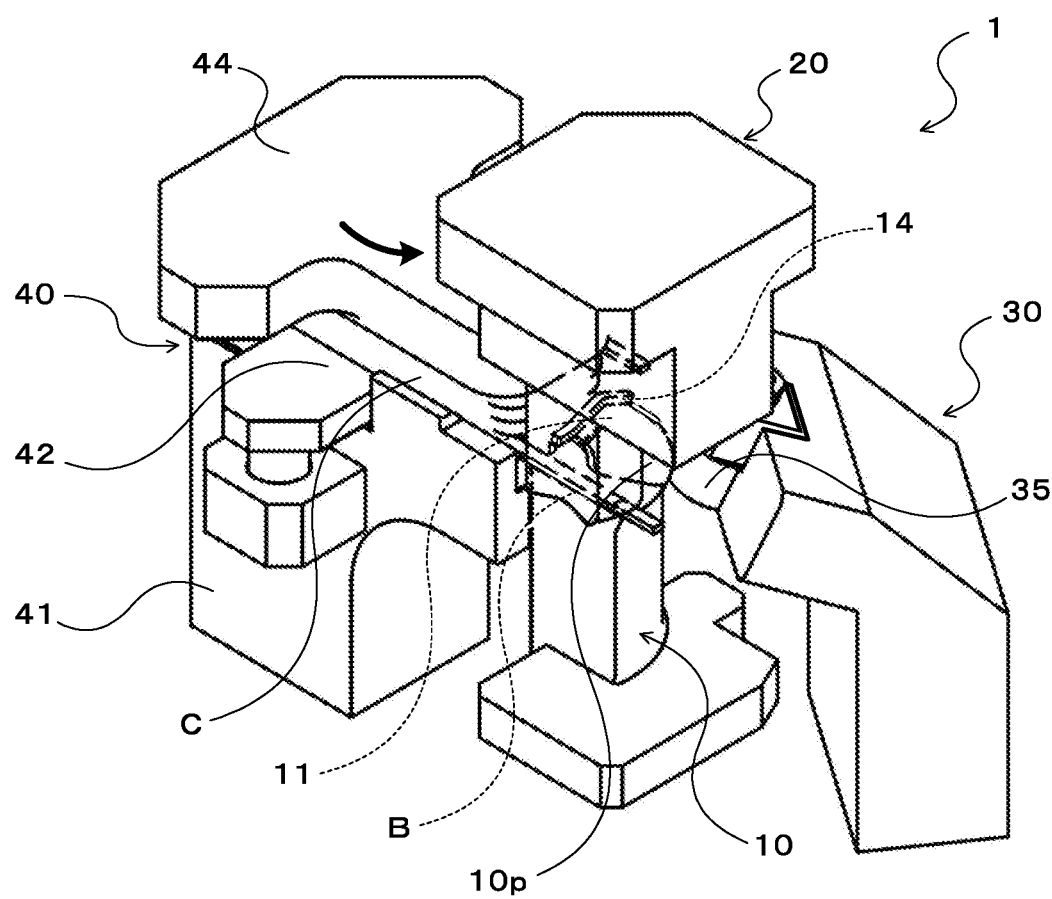
FIG. 6 is a perspective view illustrating the operation of the conductor shaping apparatus according to the disclosure.

Then, as shown in FIG. 6, the controller 100 controls the motor M2 of the second driving device 60 so as to rotate the second shaping die 20 up to a position where the guide surface of the second shaping die 20 is opposed to the upper surface in the figure of the bus bar portion B of the coil C (stop position of the second shaping die 20 when shaping the bus bar portion B) about the rotational axis RA in a counterclockwise direction in the figure. Further, the controller 100 controls the motor M1 of the first driving device 50 so as to rotate the first shaping die 10 with respect to the second shaping die 20 in a clockwise direction in FIG. 6 by a predetermined angle 91 about the rotational axis RA. The angle θ1 is defined such that a space between the side surface of the stepped portion 14 of the first shaping die 10 and the side surface of the above stepped portion of the second shaping die 20 becomes substantially the same as a width of the bus bar portion B when the first shaping die 10 is rotated by the angle θ1 from the initial position, for example.

Figure 7:
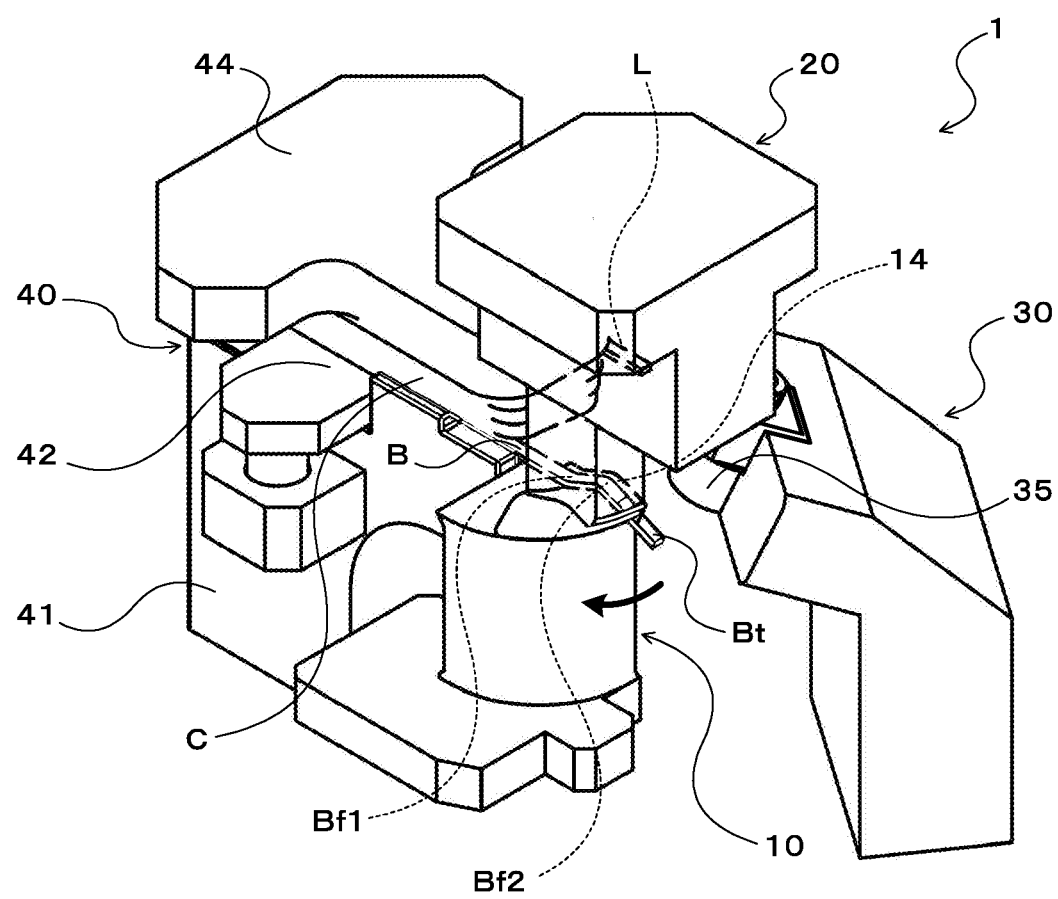
FIG. 7 is a perspective view illustrating the operation of the conductor shaping apparatus according to the disclosure.

The first shaping die 10 that is rotated about the rotational axis RA gradually approaches the second shaping die 20, so that the bus bar portion B of the coil C held by the coil holding section 40 is gradually pressed upward in FIG. 6 in the flatwise direction by the pressing surface 10p of the first shaping die 10. Further, according to an increase in a rotational angle of the first shaping die 10, the bus bar portion B is clamped between the first flatwise shaping surface 11 of the first shaping die 10 and the second flatwise shaping surface of the second shaping die 20. As a result, the flatwise bent portions Bf1 and Bf2 are formed in the bus bar portion B as shown in FIG. 7 when the first shaping die 10 is rotated with respect to the second shaping die 20 by the predetermined angle θ1 about the rotational axis RA. As shown in FIG. 7, the distal end portion of the bus bar portion B protrudes outward via a clearance between the first and second shaping dies 10 and 20 when the first shaping die 10 is rotated by the predetermined angle θ1 about the rotational axis RA.

In the conductor shaping apparatus 1, the controller 100 controls the motor M1 of the driving device 50 so that the drive shaft S1 is rotated at a predetermined rotational speed until a predetermined time elapses after a start of the rotation of the first shaping die 10 (rotational speed control). For example, the predetermined time is predetermined as a time until a portion of the bus bar portion B pressed by the pressing surface 10p of the first shaping die 10 contacts with the first flatwise shaping surface 11 of the first shaping die 10 after the start of the rotation of the first shaping die 10. The rotational speed control of the motor M1 while the bus bar portion B is pressed by the pressing surface 10p satisfactorily reduces a time required to form the flatwise bent portions Bf1 and Bf2 in the bus bar portion B.

When the above predetermined time has elapsed after the start of the rotation of the first shaping die 10, the controller 100 controls the motor M1 of the first driving device 50 so as to apply a predetermined rotational torque to the drive shaft S1 (torque control). Further, the controller 100 controls the motor M2 of the second driving device 60 so as to apply a rotational torque for stopping the second shaping die at the above stop position when shaping the bus bar portion B to the drive shaft S2. That is, the first driving device 50 applies the rotational torque (driving force) to the first shaping die 10 and the second driving device 60 applies the rotational torque (driving force) to the second shaping die 20 when shaping the bus bar portion B while rotating the first shaping die 10 with respect to the second shaping die 20. As a result, the bus bar portion B is tightly clamped between the first and second shaping dies 10 and 20, so that the flatwise bent portions Bf1 and Bf2 are accurately formed.

When the rotational angle of the first shaping die 10 becomes the angle θ1, the controller 100 once stops an output of torque from the motors M1 and M2 of the first and second driving devices 50 and 60 or the rotation of the first shaping die 10. Then, the controller 100 controls the motors M1 and M2 of the first and second driving devices 50 and 60 so that the first and second shaping dies 10 and 20 are integrally rotated about the rotational axis RA in the counterclockwise direction in FIG. 7 by a predetermined angle θ2 therefrom. In the conductor shaping apparatus 1, the rotational direction of the first and second shaping dies 10 and 20 that are integrally rotated is contrary to the rotational direction of the first shaping die 10 with respect to the second shaping die 20 when shaping the flatwise bent portions Bf1 and Bf2. Further, the controller 100 controls the motors M1 and M2 of the first and second driving devices 50 and 60 so as to rotate the first and second shaping dies 10 and 20 about the rotational axis RA at a same rotational speed.

Figure 8:
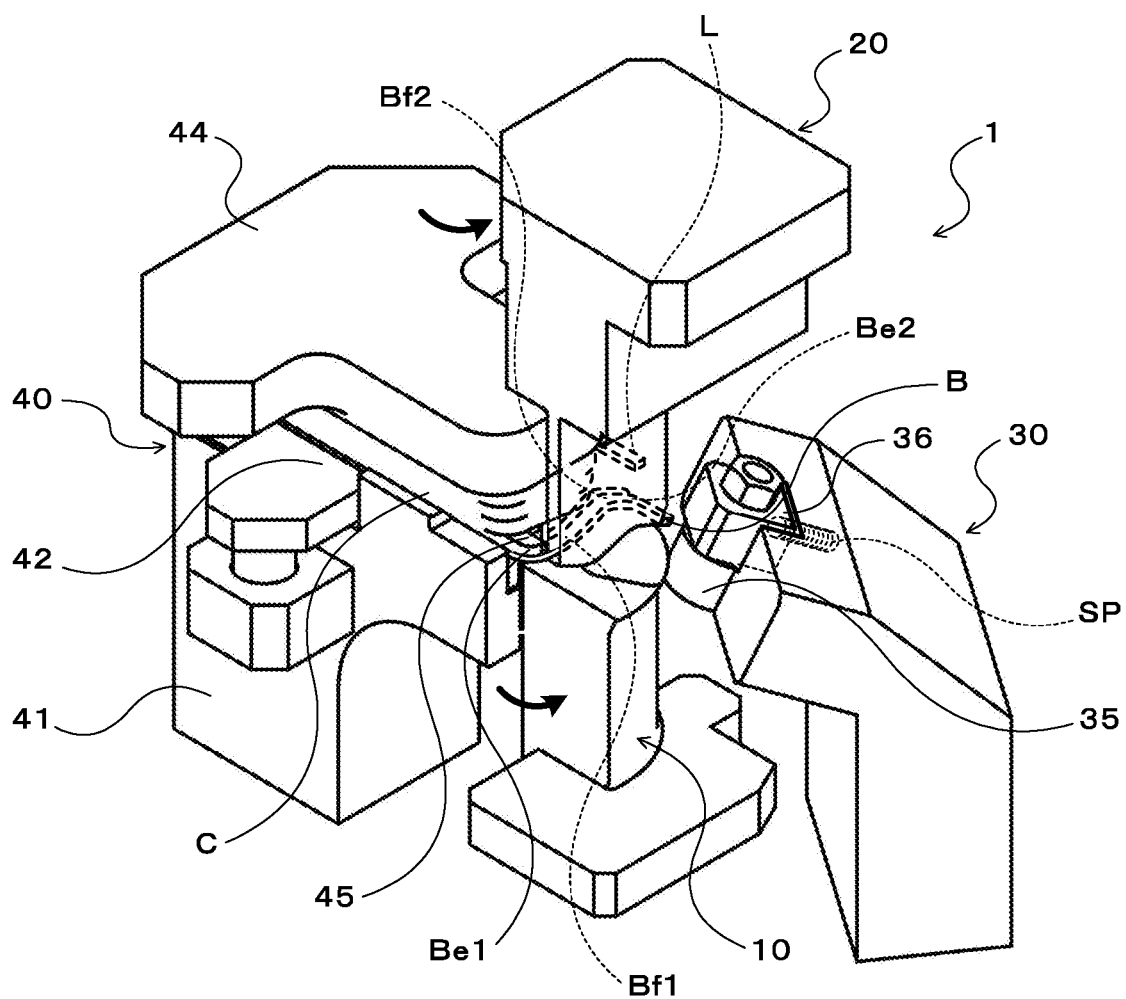
FIG. 8 is a perspective view illustrating the operation of the conductor shaping apparatus according to the disclosure.

When the first and second shaping dies 10 and 20 are integrally rotated, a portion of the bus bar portion B between the portion (proximal end) of the bus bar portion B restrained by the proximal end shaping portion 45 of the coil holding section 40 and the portion of the bus bar portion B held (clamped) between the first and second shaping dies 10 and 20 (the stepped portion 14 of the first shaping die 10 and the stepped portion of the second shaping die 20) is pressed against the edgewise shaping surface of the proximal end shaping portion 45 so as to be bent in the edgewise direction. As a result, as shown in FIG. 8, the edgewise bent portion Be1 in the most proximal end side is formed in the bus bar portion B by integrally rotating the first and second shaping dies 10 and 20 about the rotational axis RA by the angle θ2. On this occasion, the bus bar portion B is tightly clamped between the first and second shaping dies 10 and 20 that are rotated about the rotational axis RA at the same rotational speed, so that the edgewise bent portion Be1 in the most proximal end side is accurately formed in the bus bar portion B.

Figure 9:
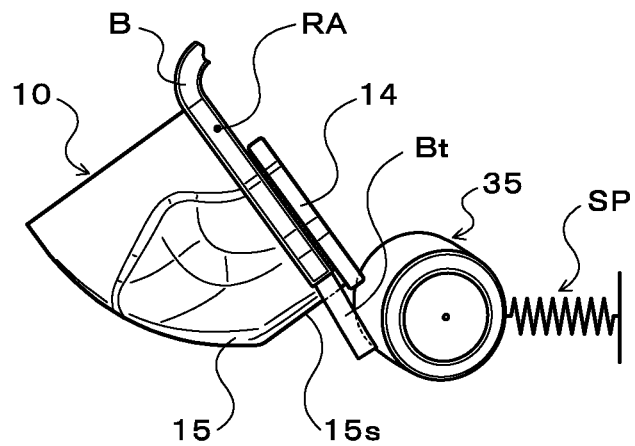
FIG. 9 is a schematic view illustrating the operation of the conductor shaping apparatus according to the disclosure.

As shown in FIG. 9, when the first and second shaping dies 10 and 20 are integrally rotated, the inner side surface (right side surface in FIG. 7) of the distal end portion Bt of the bus bar portion B that protrudes outward via the clearance between the first and second shaping dies 10 and 20 contacts with the shaping roller 35 of the distal end shaping portion on a downstream side of the stop position of the first shaping die 10 (where the first and second shaping dies 10 and 20 start rotating integrally) in the rotational direction of the first and second shaping dies 10 and 20. When the distal end portion Bt of the bus bar portion B contacts with the shaping roller 35, the spring SP presses the shaping roller 35 against the distal end portion Bt of the bus bar portion B that is rotated while being held by the first and second shaping dies 10 and (the stepped portion 14 of the first shaping die 10 and the stepped portion of the second shaping die 20) depending on a displacement thereof. The shaping roller 35 rolls on the inner side surface of the distal end portion Bt of the bus bar portion B in accordance with the rotation of the first and second shaping dies 10 and 20 while being pressed against the bus bar portion B by the spring SP. As a result, the distal end portion Bt of the bus bar portion B is pressed by the shaping roller 35 to be bent in a direction opposite to the rotational direction of the first and second shaping dies 10 and 20 in response to a relative movement between the shaping roller 35 and the first and second shaping dies 10 and 20. That is, the distal end portion Bt of the bus bar portion B is bent in the edgewise direction so as to extend in a direction opposite to an extending direction of the edgewise bent portion Be1 in the most proximal end side.

Figure 10:
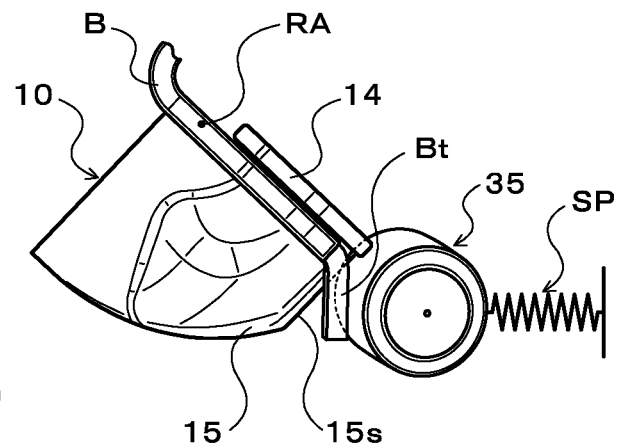
FIG. 10 is a schematic view illustrating the operation of the conductor shaping apparatus according to the disclosure.
Figure 11:
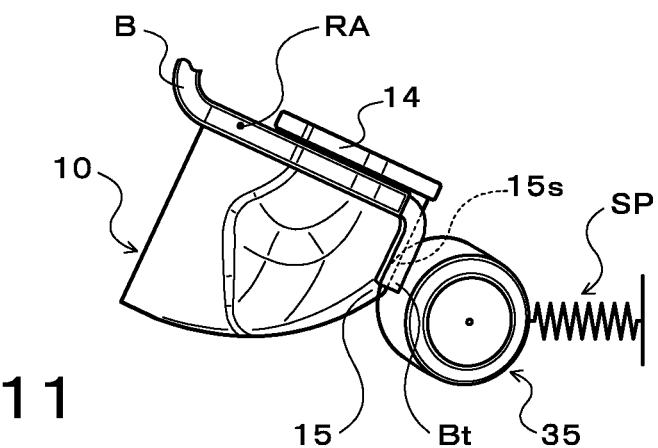
FIG. 11 is a schematic view illustrating the operation of the conductor shaping apparatus according to the disclosure.

In the conductor shaping apparatus 1 of the embodiment, the roller movement restricting portion 15 is formed in the outer circumferential portion of the first shaping die 10. When a force from the spring SP becomes larger depending on the displacement of the spring SP, as shown in FIG. 10, the shaping roller 35 contacts with the outer circumferential surface 15s of the roller movement restricting portion 15 of the first shaping die 10 while rolling on the inner side surface of the distal end portion Bt of the bus bar portion B. Further, as shown in FIG. 11, the shaping roller 35 presses the distal end portion Bt of the bus bar portion B and rolls on the outer circumferential surface 15s of the roller movement restricting portion 15 depending on the force from the spring SP.

The outer circumferential surface 15s of the roller movement restricting portion 15 contacts with the shaping roller 35 and restricts a movement of the shaping roller 35 to the distal end portion Bt of the bus bar portion B by the force from the spring SP when the first and second shaping dies 10 and 20 are moved with respect to the shaping roller 35. This configuration decreases a movable range of the shaping roller or an extension and contraction range of the spring SP while adequately securing rigidity of the spring SP required to bend the bus bar portion B, thereby preventing a pressing force applied to the bus bar portion B from the shaping roller 35 depending on the displacement of the spring SP from unnecessarily increasing.

Figure 12:
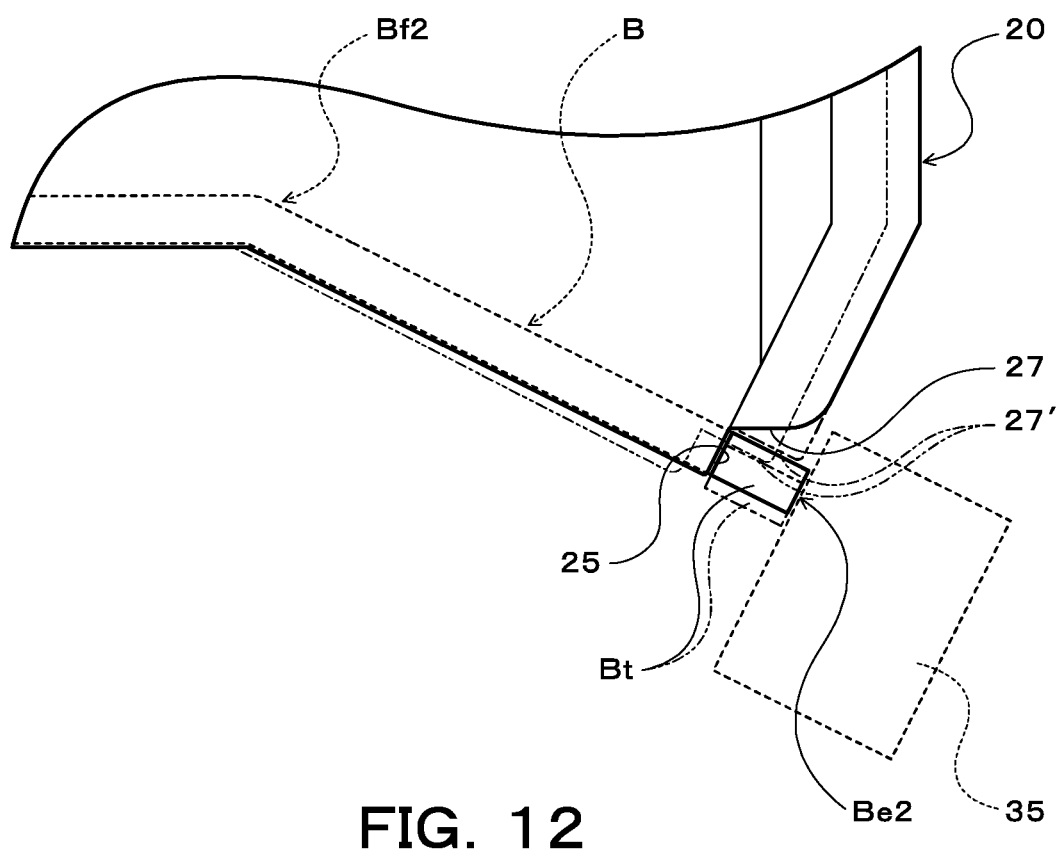
FIG. 12 is a schematic view illustrating the operation of the conductor shaping apparatus according to the disclosure.
Figure 13:
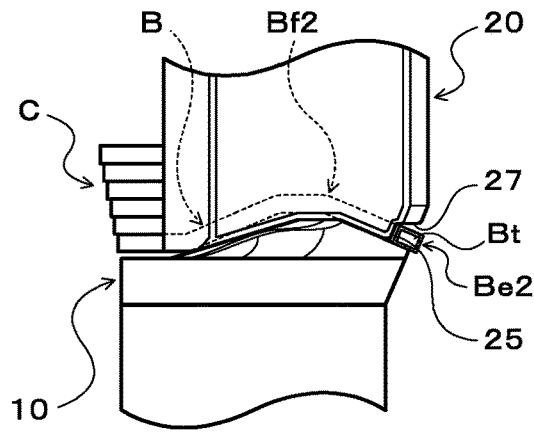
FIG. 13 is a schematic view illustrating the operation of the conductor shaping apparatus according to the disclosure.
Figure 14:
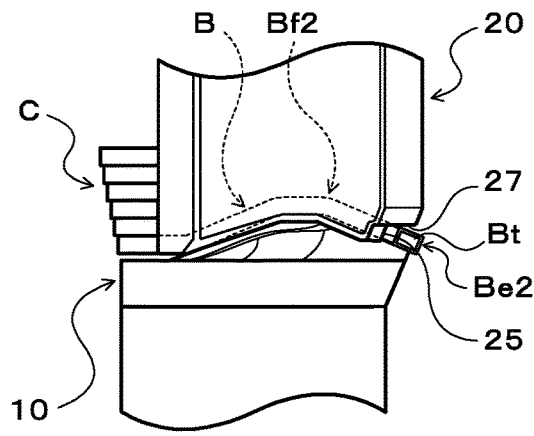
FIG. 14 is a schematic view illustrating the operation of the conductor shaping apparatus according to the disclosure.
Figure 15:
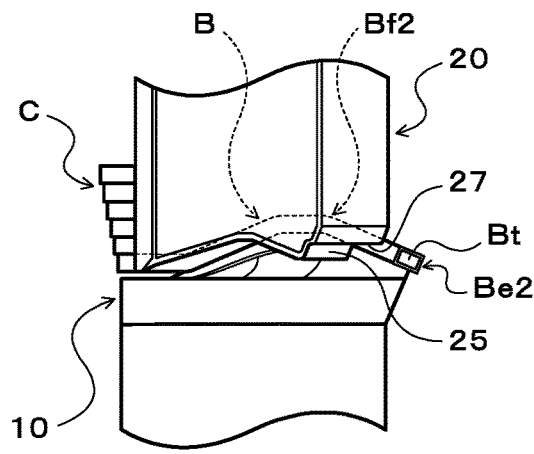
FIG. 15 is a schematic view illustrating the operation of the conductor shaping apparatus according to the disclosure.

Then, the distal end portion Bt (a portion on the distal end side of the edgewise bent portion Be2) of the bus bar portion B is guided to the supporting surface 25 by the distal end guide surface 27 of the second shaping die 20 or the upper die that is positioned on an opposite side of the bent direction (downward direction) of the flatwise bent portion Bf2 closest to the edgewise bent portion Be2 when the distal end portion Bt is pressed by the shaping roller 35. As a result, the side surface including the short sides (edgewise surface) of the distal end portion Bt contacts with the supporting surface 25 and is supported by the supporting surface 25, so that the distal end portion Bt of the bus bar portion B is clamped between the supporting surface 25 and the shaping roller 35 as shown in FIG. 12.

Accordingly, the edgewise bent portion Be2 in the most distal end side is accurately formed in the bus bar portion B by integrally rotating the first and second shaping dies 10 and about the rotational axis RA by the angle θ2 as shown in FIG. 8. In the conductor shaping apparatus 1, the bus bar portion B is not excessively pressed by the shaping roller 35 that is pressed by the spring SP, thereby preventing the edgewise bent portion Be2 from being excessively bent and a portion of the bus bar portion B near the edgewise bent portion Be2 (where the insulating layer is removed) from being damaged by the shaping roller 35. Further, the edgewise bent portion Be2 is formed in the distal end portion Bt of the bus bar portion B with the shaping roller 35 that is pressed by the spring SP instead of a shaping section including a movable section such as a cam mechanism or a dedicated driving device, so that complication of a structure of the conductor shaping apparatus 1 and an increase in a facility cost can be reduced.

In the conductor shaping apparatus 1, the bus bar portion B is tightly clamped between the first and second shaping dies 10 and 20 that are rotated about the rotational axis RA at the same rotational speed, so that the edgewise bent portion Be2 in the most distal end side is accurately formed in the bus bar portion B. In the conductor shaping apparatus 1, the angle θ2 for integrally rotating the first and second shaping dies 10 and 20 is defined in consideration of bent angles of the edgewise bent portions Be1 and Be2 and springback of the bus bar portion B (rectangular wire). Further, a position (protruding amount) of the roller movement restricting portion 15 in the first shaping die 10 is defined in consideration of rigidity of the spring SP, the bent angle of the edgewise bent portion Be2, and springback of the bus bar portion B (rectangular wire).

When the rotational angle of the first and second shaping dies 10 and 20 becomes the angle θ2 and the edgewise bent portions Be1 and Be2 are formed completely, the controller 100 stops the motors M1 and M2 of the first and second driving devices 50 and 60 so as to stop the rotation of the first and second shaping dies 10 and 20. Then, the controller 100 controls the motor M2 of the second driving device 60 so that the second shaping die 20 is rotated about the rotational axis RA and returns to the initial position. That is, the controller 100 controls the motor M2 of the second driving device 60 so that the second shaping die 20 is rotated in a direction from the edgewise bent portion Be2 to the distal end (end surface of the distal end portion Bt) of the bus bar portion B (clockwise direction in FIG. 7 and front side in FIG. 12) so as to separate the second shaping die 20 from the first shaping die 10. In the conductor shaping apparatus 1, the controller 100 controls the motor M2 of the second driving device 60 so that the drive shaft S2 is rotated at a predetermined rotational speed (rotational speed control).

Here, a shape (dimension) of the distal end portion Bt of the bus bar portion B may be satisfactorily stabilized when the first and second shaping dies 10 and 20 are rotated about the rotational axis RA by the angle θ2 if the distal end guide surface 27 of the second shaping die 20 is formed like a distal end guide surface 27' (refer to two-dot chain line in FIG. 12) that extends in parallel with the upper surface in the figure (surface including the long sides or a flatwise surface) of the bus bar portion B after the edgewise bent portion Be2 is formed. However, in such a case, the distal end guide surface 27' of the second shaping die 20 interferes with the distal end portion Bt of the bus bar portion B when the second shaping die is rotated in the direction from the edgewise bent portion Be2 to the distal end of the bus bar portion B (front side in FIG. 12) so as to be separated from the first shaping die 10. Thus, the distal end portion Bt is pressed downward in the figure and deformed by the distal end guide surface 27' as the second shaping die 20 is separated from the first shaping die 10, so that the shape and the dimension of the distal end portion Bt may deteriorates. Further, the distal end portion Bt slidably contacts with the distal end guide surface 27', so that the portion where the insulating layer is removed may be damaged and the insulating layer may be peeled.

By taking into account the foregoing, in the embodiment, the distal end guide surface 27 of the second shaping die 20 is configured to includes a flat surface that is orthogonal to the rotational axis RA and intersects the upper edge of the supporting surface 25. That is, the distal end guide surface 27 is formed to extend away from the distal end portion Bt of the bus bar portion B in the direction (upward direction) opposite to the bent direction (downward direction) of the flatwise bent portion Bf2 as it extends away from the supporting surface 25 on an opposite side of the rotational axis RA (outward in the radial direction). Thus, the distal end guide surface 27 does not interfere with the distal end portion Bt of the bus bar portion B when separating the second shaping die 20 from the first shaping die 10. As a result, the second shaping die 20 is separated from the first shaping die 10 while reducing a deformation of the distal end portion Bt of the bus bar portion B due to a contact with the second shaping die 20, damage of the portion where the insulating layer is removed, and a peel of the insulating layer. Accordingly, the conductor shaping apparatus 1 is capable of accurately forming the edgewise bent portion Be2 with a desired shape in the distal end portion Bt of the bus bar portion B and preventing the deformation of the distal end portion Bt of the bus bar portion B caused by forming the edgewise bent portion Be2.

Figure 16:
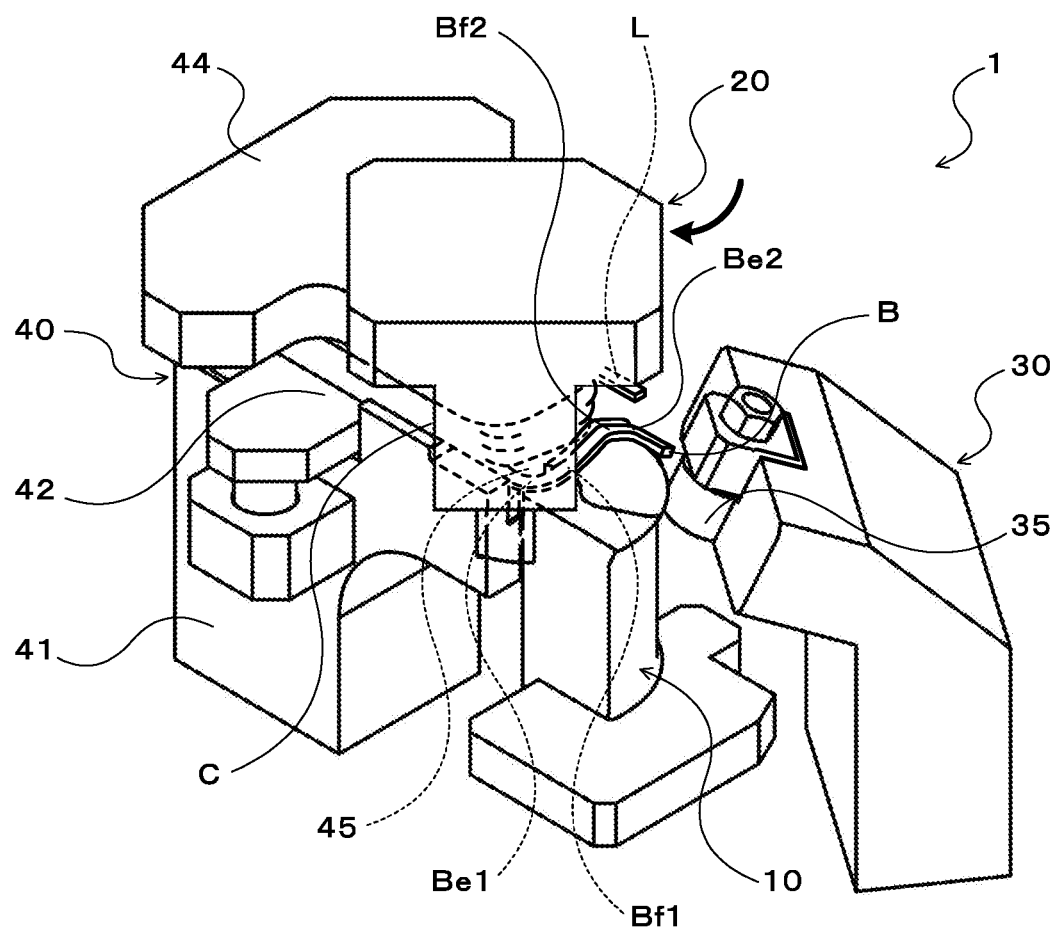
FIG. 16 is a perspective view illustrating the operation of the conductor shaping apparatus according to the disclosure.
Figure 17:
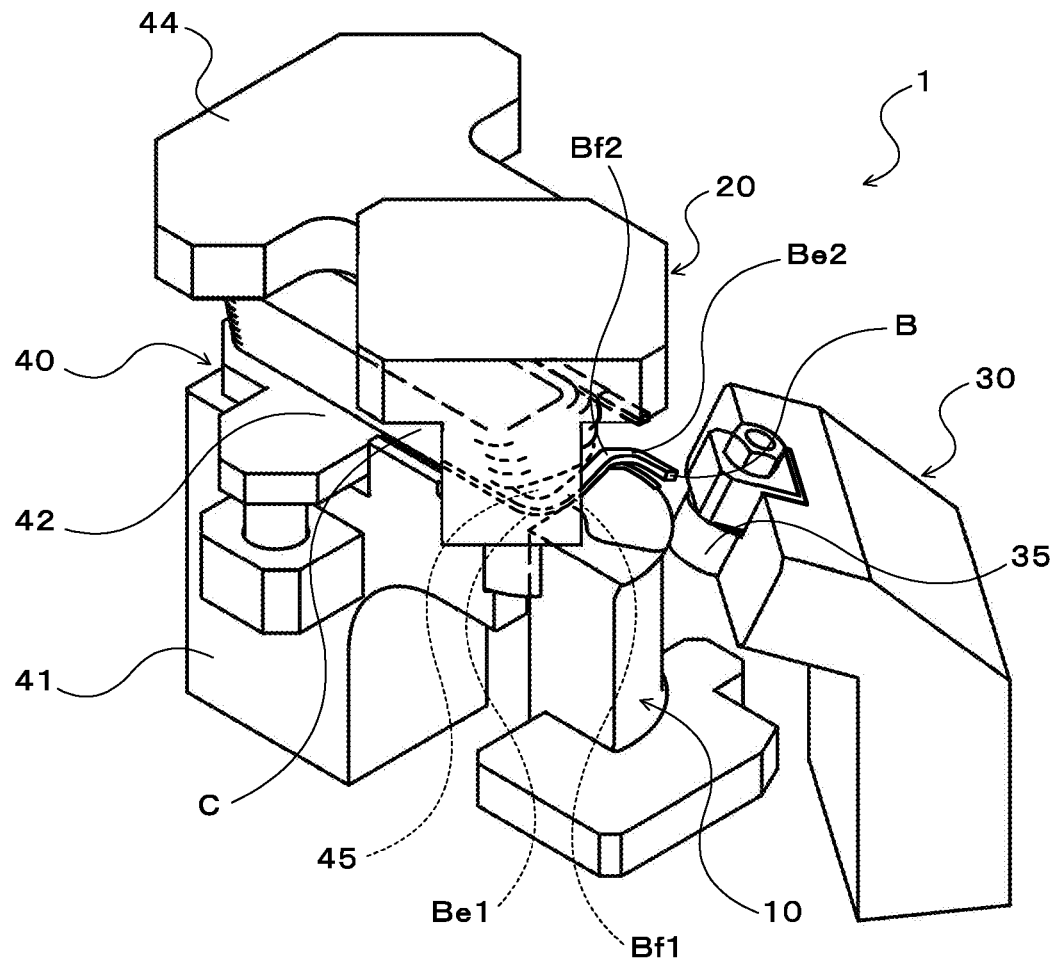
FIG. 17 is a perspective view illustrating the operation of the conductor shaping apparatus according to the disclosure.

When the second shaping die 20 returns to the initial position, as shown in FIG. 16, the controller 100 controls the driving mechanism of the coil holding section 40 so as to raise the coil placing table 42 and the coil pressing plate 44 to respective initial positions shown in FIG. 1. Thus, as shown in FIG. 17, the coil pressing plate 44 is separated from the coil C and the coil C is raised together with the coil placing table 42. Then, the coil C with the shaped bus bar portion B is transferred to the coil conveyor (not shown). After that, the plurality of edgewise bent portions Be1, Be2 and the plurality of flatwise bent portions Bf1, Bf2 are formed in the bus bar portion B by the conductor shaping apparatus 1 when the coil C with the unshaped bus bar portion B is placed on the coil placing table 42.

As has been described above, the conductor shaping apparatus 1 relatively rotates the first and second shaping dies 10 and 20 about the rotational axis RA by the first and second driving devices 50 and 60, so that the flatwise bent portions Bf1 and Bf2 are formed in the bus bar portion B of the coil C. Further, the conductor shaping apparatus 1 rotates the first and second shaping dies 10 and 20 that hold the bus bar portion B with respect to the shaping roller 35 by the first and second driving devices 50 and 60 so as to form the edgewise bent portion Be2 in the distal end portion Bt of the bus bar portion B. On this occasion, the distal end portion Bt is pressed by the shaping roller 35 and is guided to the supporting surface 25 by the distal end guide surface 27 that is formed in the second shaping die 20 and is positioned on the opposite side of the bent direction (downward direction) of the flatwise bent portion Bf2 closest to the edgewise bent portion Be2 so as to be clamped between the supporting surface 25 and the shaping roller 35. As a result, the edgewise bent portion Be2 with the desired shape is accurately formed in the distal end portion Bt of the bus bar portion B.

After the edgewise bent portion Be2 is formed in the distal end portion Bt of the bus bar portion B, the second driving device 60 rotates the second shaping die 20 in the direction from the edgewise bent portion Be2 to the distal end of the bus bar portion B so as to separate the second shaping die 20 from the first shaping die 10. When the second shaping die 20 is rotated so as to be separated from the first shaping die 10, the distal end guide surface 27 does not interfere with the distal end portion Bt of the bus bar portion B, because the distal end guide surface 27 is formed to extend away from the distal end portion BT in the direction (upward direction) opposite to the bent direction (downward direction) of the flatwise bent portion Bf2 as the distal end guide surface 27 extends away from the supporting surface 25 on the opposite side of the rotational axis RA (outward in the radial direction). This configuration prevents the distal end portion Bt of the bus bar portion B from being deformed by the second shaping die 20 when separating the second shaping die 20 from the first shaping die 10.

Accordingly, the conductor shaping apparatus 1 is capable of accurately forming the edgewise bent portion Be2 with the desired shape in the distal end portion Bt of the bus bar portion B and preventing the deformation of the distal end portion Bt of the bus bar portion B caused by forming the edgewise bent portion Be2.

In the conductor shaping apparatus 1, the height H of the supporting surface 25 is defined to be 1-1.5 times, preferably 1-1.2 times the thickness of the bus bar portion B in the flatwise direction (length of the short side). This configuration enables the distal end portion Bt of the bus bar portion B to be tightly clamped between the supporting surface 25 and the shaping roller 35, so that the edgewise bent portion Be2 is accurately formed in the bus bar portion B.

The distal end guide surface 27 includes the flat surface that intersects the upper edge of the supporting surface 25 and is orthogonal to the rotational axis RA. This configuration enables the distal end portion Bt of the bus bar portion B to be smoothly guided to the support surface 25 by the distal end guide surface 27 when forming the edgewise bent portion Be2 and prevents the interference between the second shaping die 20 and the bus bar portion B (distal end portion Bt) when separating the second shaping die 20 from the first shaping die 10.

Further, the conductor shaping apparatus 1 includes the spring SP that presses the shaping roller 35 against the distal end portion Bt in response to the contact between the shaping roller 35 and the distal end portion Bt of the bus bar portion B, and the roller movement restricting portion 15 formed in the outer circumferential portion of the first shaping die 10. The roller movement restricting portion 15 contacts with the shaping roller 35 so as to restrict the movement of the shaping roller 35 on the side of the distal end portion Bt of the bus bar portion B by the force from the spring SP when the first and second shaping dies 10 and 20 are moved with respect to the shaping roller 35.

This configuration decreases the movable range of the shaping roller 35 or the extension and contraction range of the spring SP while adequately securing the rigidity of the spring SP required to bend the bus bar portion B, thereby preventing the pressing force applied to the bus bar portion B from the shaping roller 35 depending on the displacement of the spring SP from unnecessarily increasing. As a result, the bus bar portion B is not excessively pressed by the shaping roller 35 that is pressed by the spring SP, thereby preventing the edgewise bent portion Be2 from being excessively bent and preventing the portion of the bus bar portion B near the edgewise bent portion Be2 (where the insulating layer is removed) from being damaged by the shaping roller 35.

The supporting surface and the distal end guide surface may be formed in the first shaping die 10 or the lower die depending on the number of the flatwise and edgewise bent portions, bent directions and bent angles of the flatwise and edgewise bent portions of the bus bar portion B. In the conductor shaping apparatus 1, the rotational direction of the one of the first and second shaping dies 10 and 20 with respect to the other of the first and second shaping dies 10 and 20 when shaping the bus bar portion B may be the same as the rotational direction of the first and second shaping dies 10 and 20 that are integrally rotated. In the conductor shaping apparatus 1, the first and second shaping dies 10 and 20 may be configured to form at least one edgewise bent portion in the bus bar portion B in addition to the flatwise bent portions Bf1 and Bf2. In the conductor shaping apparatus 1, the motors M1 and M2 of the first and second driving devices 50 and 60 may be controlled so as to make the torque applied to one of the first and second shaping dies 10 and 20 on a rear side in the rotational direction become equal to or larger than the torque applied to the other of the first and second shaping dies 10 and 20 on a front side in the rotational direction when the first and second shaping dies 10 and 20 are integrally rotated about the rotational axis RA.

The roller movement restricting portion may be formed in the second shaping die 20 depending on structures of the first and second shaping dies 10 and 20. The supporting block that supports the shaping roller 35 may be rotated about the rotational axis RA instead of integrally rotating the first and second shaping dies 10 and 20. The first and second shaping dies 10 and 20 and the shaping roller 35 (supporting block 31) may be relatively moved along a predetermined axis. A shape of the outer circumferential surface 15s of the roller movement restricting portion 15 may be freely defined in accordance with the shape of the distal end portion Bt of the bus bar portion B. The distal end shaping portion 30 may include a shaping member that does not include a movable section such as a block member with an edgewise shaping surface or a belt instead of the shaping roller 35.

The disclosure is not limited to the above embodiments in any sense but may be changed, altered or modified in various ways within the scope of extension of the disclosure.

Additionally, the embodiments described above are only concrete examples of some aspect of the disclosure described in Summary and are not intended to limit the elements of the disclosure described in Summary.

INDUSTRIAL APPLICABILITY

The techniques according to the disclosure is applicable to, for example, the field of manufacture of the conductor with the bent portion.

The invention claimed is:

1. A conductor shaping apparatus configured to relatively rotate an upper die and a lower die about a rotational axis so as to form at least one flatwise bent portion in a conductor and to relatively rotate the upper and lower dies that hold the conductor and a shaping member so as to format least one edgewise bent portion in an end portion of the conductor while pressing the shaping member against the end portion, the conductor shaping apparatus comprising:
   a driving device configured to relatively rotate the upper and lower dies and to integrally rotate the upper and lower dies with respect to the shaping member, the driving device configured to rotate one of the upper and lower dies in a direction from the edgewise bent portion to a distal end of the conductor so as to separate the one of the upper and lower dies from the other,
   wherein one of the upper and lower dies includes a supporting surface configured to support a side surface of the end portion as the edgewise bent portion is formed in the end portion of the conductor, and a guide surface that is formed to intersect the support surface, the guide surface extending away from the end portion of the conductor in a direction opposite to a bent direction of the flatwise bent portion closest to the edgewise bent portion as it extends away from the supporting surface on an opposite side of the rotational axis.

2. The conductor shaping apparatus according to claim 1, wherein a height of the supporting surface is 1-1.5 times a thickness of the conductor in a flatwise direction.

3. The conductor shaping apparatus according to claim 1, wherein the guide surface includes a flat surface orthogonal to the rotational axis.

4. The conductor shaping apparatus according to claim 1, wherein the supporting surface and the guide surface are formed in the upper die.

5. The conductor shaping apparatus according to claim 4, further comprising:
   an elastic body that presses the shaping member against the end portion in response to a contact between the shaping member and the end portion of the conductor, and
   wherein the lower die includes a movement restricting portion that contacts with the shaping member so as to restrict a movement of the shaping member on a side of the end portion by a force from the elastic body when the upper and lower dies and the shaping member are relatively rotated.

6. The conductor shaping apparatus according to claim 1, wherein the driving device includes an upper driving device configured to apply driving force to the upper die and to rotate the upper die about the rotational axis, and a lower driving device configured to apply driving force to the lower die and to rotate the lower die about the rotational axis.

7. The conductor shaping apparatus according to claim 1, wherein the conductor is a bus bar portion that extends from one end of a coil, and
wherein the holding section is configured to hold the coil.

* * * * *